Feb. 23, 1954
J. D. PETERSON
2,670,157
ENGINE CONTROL AND SYNCHRONIZATION SYSTEM
Filed April 18, 1947
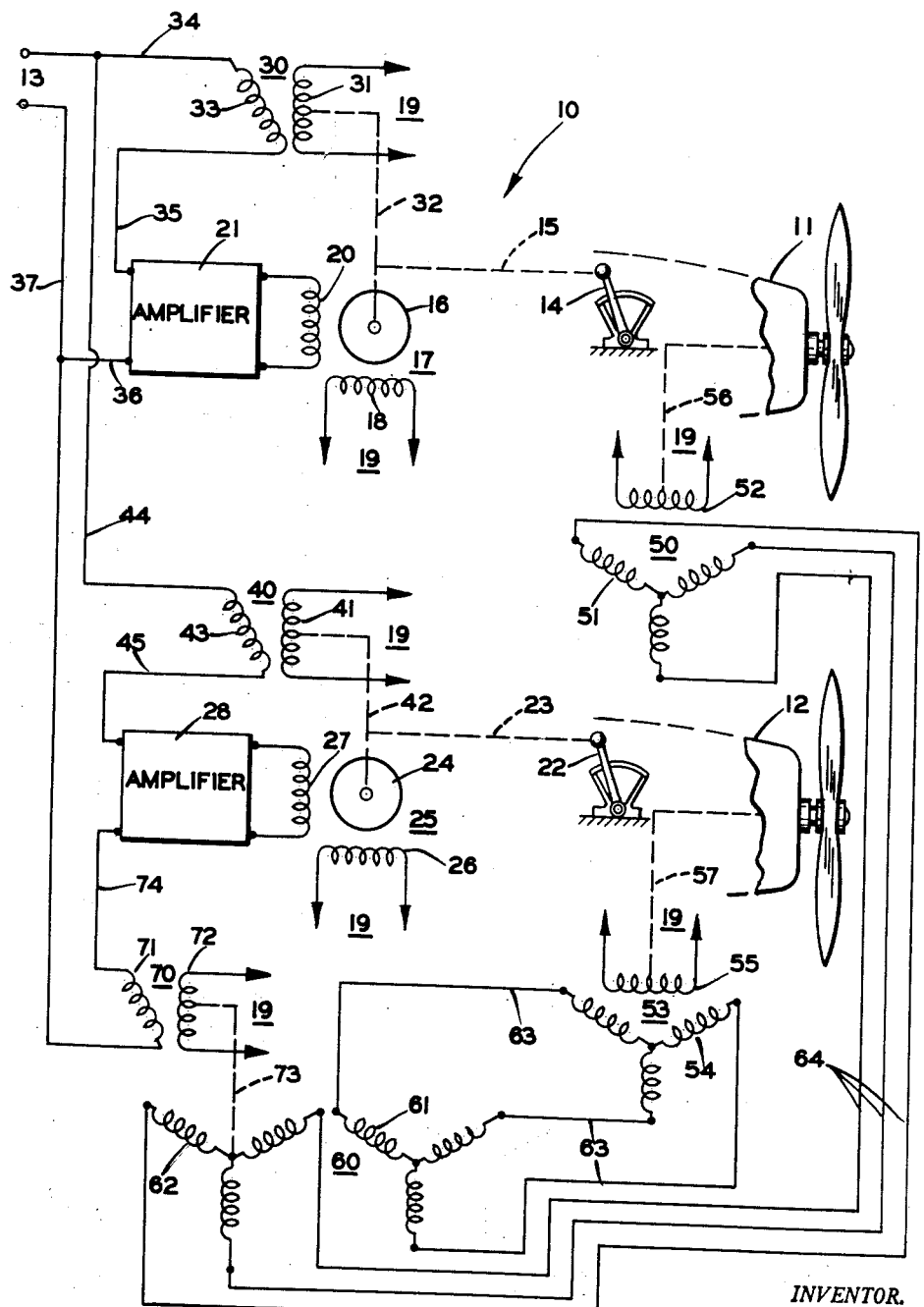
INVENTOR.
JOEL D. PETERSON
BY
-ATTORNEY- Patented Feb. 23, 1954

2,670,157

UNITED STATES PATENT OFFICE 2,670,157

ENGINE CONTROL AND SYNCHRONIZATION SYSTEM

Joel D. Peterson, Ridgewood, N. J., assignor to Bendix Aviation Corporation, Teterboro, N. J., a corporation of Delaware Application April 18, 1947, Serial No. 742,438

9 Claims. (Cl. 244—77)

This invention relates to an engine control and synchronization system for the automatic landing of aircraft in which signal voltages, developed by the deviation of the aircraft from the glide path beam, control the engine torque.

It has heretofore been the general practice in synchronizing the speeds of two or more engines aboard a multi-engined aircraft, to provide centrifugal means for matching the engine speed of a slave engine with that of the master engine. Such systems normally include a fly-ball governor which act upon a speeder spring for varying the propellor pitch. While such systems have proven their worth in maintaining the engine speeds synchronized during normal flight conditions, they have been found impractical in the present day practice of landing aircraft by remote control, as for example, by a system described in the copending application of Paul A. Noxon et al. for Automatic Control of Mobile Craft bearing Serial No. 705,524 filed on October 25, 1946, now Patent No. 2,592,173.

In the landing approach system of the above disclosure, signal voltages are developed by a computer in response to the deviation of the aircraft from the localizer beam and the glide path beam broadcast from the ground station. The signal voltages thus developed are used to modify or overcome other signal voltages developed in the automatic pilot to affect the operation of the rudder, elevator and aileron to maintain the craft on the two landing beams, for eventually landing the same. The airspeed of the plane may also be retarded by the developed signal voltages by reducing the speed of the engines. The reduction in engine speed in landing, however, is often such that the governing action of the prior system becomes ineffectual in that the propellor pitch is reduced to the low pitch stop. Insufficient torque is developed by the engines so that the aircraft loses headway which often results in airport crashes due to the loss of flying speed.

It is an object of my present invention to provide a control system for landing aircraft which is responsive to the signal voltages developed by a computer in the glide path control beam channel for reducing the engine torque.

Another object of my invention is to provide an engine control and synchronizing system for a multi-engined craft in which the speed of engine operation is controlled by beamed signal voltages and the engines synchronized to the indicated speed by a speed differential signal voltage.

A further object of this invention is to provide a control and synchronization system for engines which is equally operative under normal flight conditions and under landing approaches when the engine speed is materially reduced.

Yet another object of this invention is to provide a highly improved and compact engine control and synchronizing system which shall be entirely automatic in its operation, positive in its action, and relatively inexpensive to manufacture, which shall have a large variety of applications, and yet be practical and efficient to a high degree in use.

Other objects of this invention will in part be obvious, and in part hereinafter pointed out.

The invention accordingly consists in features of construction, combinations of elements, and arrangements of parts which will be exemplified in the construction hereinafter described, and of which the scope of application will be indicated in the appended claims.

In the single figure of the drawing forming a part of this specification showing a schematic wiring diagram of my novel synchronization system, 10 designates a circuit embodying one illustrative form of my present invention. The circuit 10 interconnects the controls of a master engine 11 and a slave engine 12 with a source of signal voltage 13 which is connected to a computer (not shown) in the glide path control channel of a landing approach system.

The master engine 11 is provided with a throttle control lever 14 adapted to be moved through gearing or linkage indicated by the dotted line 15 by the rotor 16 of a two phase induction motor 17. The motor 17 is provided with a fixed phase 18 connected to a suitable source of power 19, and a variable phase 20 connected to the output of an amplifier 21.

The slave engine 12 is similarly provided with a throttle lever 22 coupled, as by 23, to the rotor 24 of a two phase motor 25. The fixed phase 26 is connected to the power source 19, while the variable phase 27 is connected to the output side of a second amplifier 28.

Connected across the signal source 13 is a synchronous motor or receiver 30 having a rotor 31 coupled to the rotor 16 as by 32, and a stator winding 33. The rotor coil 31 is connected across the potential source 19. The stator winding 33 is connected at one end by lead 34 to one terminal of the signal source, and at the other end by lead 35 through the amplifier 21 and leads 36, 37 to the other terminal of the signal source.

The angular position of the rotor coil 31 is such that the voltage induced in the stator coil 33 of the receiver 30 balances the voltage of the signal source. No voltage will therefore be impressed on the input leads 35, 36 of the amplifier 21. Motor 17 will thus be at a standstill.

When a change in signal occurs, a voltage is impressed on leads 34 and 37, 36 to unbalance the circuit described, resulting in a signal being impressed on the amplifier input leads 35, 36. This voltage is amplified by the amplifier 21 and applied to the variable phase 20 of the two phase motor 17. The rotor 16 will thus rotate to displace angularly by way of coupling 32, the rotor coil 31 until such time when the induced voltage due to the coil 31 in the stator coil 33 balances the voltage of the signal source 13. The circuit is then in equilibrium until the signal voltage of the source 13 is again altered.

Rotation of the rotor 16 of the induction motor 17 will shift the throttle lever 14 of the master engine 11. The speed of the engine 11 is thus altered in response to the signal voltage of the source 13.

The slave motor 12 is provided with a similar speed control circuit, comprising a receiver 40 having a rotor coil 41 connected to the potential source 19 and driven by rotor 24 through a coupling 42; and a stator coil 43. The stator coil 43 is connected at one end by lead 44 to the signal source 13, and by lead 45 through amplifier 28 and lead 37 to the other terminal of the signal source. The two speed control circuits are in parallel across the signal source 13 and will actuate the respective throttle levers 14 and 22 to control the speed of engines 11 and 12 in response to the signals of the source 13.

Means is now provided to synchronize the speed of engine 12 with that of the master engine 11.

To this end, there is provided a synchronous generator, or transmitter 50 for the master engine 11 having a three phase stator winding 51 and a single phase rotor winding 52 connected to the power source 19; and a similar transmitter 53 for the slave engine 12 having a three phase stator winding 54 and a rotor winding 55. The rotors 52 and 55 are adapted to be rotated by the propellor shafts of their respective engines through the couplings indicated by the dotted lines 56 and 57, respectively.

There is further provided a differential motor 60 having a three phase stator coil 61 and a three phase rotor coil 62. The stator coil 61 is connected by leads 63 to the stator coil 54 of the slave transmitter 53, while the rotor coil 62 is connected by leads 64 to the stator coil 51 of the master transmitter 50.

The rotation of the rotor coils 52 and 55 by their respective propellor shafts will induce voltages in the stator windings 51 and 54. The voltages thus induced appear in the differential motor windings 62 and 61, respectively. The magnetic fields due to the currents produced thereby will rotate at a speed proportional to the speed of the respective engine driving the transmitter. When the speed of the rotating fields of the rotor and stator are equal, the rotor 62 is at a standstill.

Should the engines 11 and 12 fall out of synchronism, a difference in the speed of the rotating fields will appear in the windings 62 and 61, the interaction of the two magnetic fields resulting in the angular displacement of the rotor winding 62. The angular displacement of the rotor 62 is proportional to the speed difference of the two transmitter systems.

There is now provided in the control circuit for the slave engine 12 a synchronous generator, transmitter or rotary transformer 70 which will impress a signal voltage thereon to synchronize the speed of the slave engine with that of the master engine.

The transmitter 70 comprises a stator coil 71 and a rotor coil 72 connected to the potential source 19, and angularly displaceable by the rotor 62 through the coupling 73. The stator coil 71 is connected in series into the circuit of the receiver 40 by leads 74 and 37.

Upon angular displacement of the differential rotor 62, the transmitter rotor 72 will be displaced to induce a signal voltage into the circuit of the receiver 40 which is proportional to the difference in speed of the two engines. The differential speed signal voltage thus added to the slave control circuit will unbalance the circuit causing the induction motor 25 to be operated. Motor 25 will thus position the rotor 41 to rebalance the control circuit, at the same time moving the throttle lever 22 to reduce or increase the speed of engine 12 to bring the slave engine into synchronism with the master engine 11.

While I have indicated the signal source 13 as being a computer in the glide path control channel of a landing approach system, it will be readily apparent that the signal source 13 could be a transmitter of a self-synchronous system, the stator coil being connected to leads 34, 37 while the rotor thereof connected to the potential source 19 being angularly displaceable, either in response to remote signals, or manually.

It will thus be seen that there is provided a speed control and synchronization system in which the several objects of this invention are achieved and which is well adapted to meet the conditions of practical use.

As various possible embodiments of the invention may be made, and as various changes may be made in the embodiment above set forth, it is to be understood that all matter herein set forth, or shown in the accompanying drawing, is to be interpreted as illustrative and not in a limiting sense.

Having thus described my invention, I claim as new and desire to secure by Letters Patent:

1. A synchronizing system comprising a master engine and a slave engine, a throttle control for each of said engines to vary the speed of operation thereof, an inductive transmitter for each of said engines adapted to develop a rotating magnetic field whose speed is proportional to the engine speed, a differential motor connected to said transmitters and having a rotor movable in response to the difference in the speed of the magnetic fields, an inductive transmitter adapted to develop a signal voltage responsive to the angular displacement of the differential rotor, and motive means operative by the differential speed signal voltage to move the throttle control of said slave engine to synchronize the speeds of said engines.

2. A control and synchronizing system comprising a master engine and a slave engine, means for controlling the speed of each individual engine, a signal receiver for each engine, a source of signal voltage to which said receivers are connected, means connected to said receiver for actuating said control means in response to the signal voltages of said source to vary the speed of said engines, and means connected in series with the receiver of the slave engine for developing a signal voltage proportional to the speed differential of said engines to synchronize the speed of the slave engine with that of the master.

3. A synchronizing system comprising a master engine and a slave engine, controls for said engines to vary the rotational speed thereof; motive means for operating said controls, a source of signal voltage, a balanced circuit for each engine connected in parallel to said signal voltage source controlling said motive means, the changes in signal voltages of said source unbalancing said circuits to actuate said motive means to vary the speed of said engines, a follow-up from said motive means for balancing said circuits when engine speed is in agreement with the signal voltage, means responsive to the speed of the engines for developing signal voltages, and means in the balanced circuit for said slave engine responsive to a differential in speed signal voltages for unbalancing said circuit to vary the speed of the slave engine to correspond with that of the master engine.

4. A control and synchronizing system comprising a master engine, and a slave engine, controls for said engines to vary the rotational speeds thereof, a motor for moving each said controls, a source of signal voltage, a balanced circuit for controlling each of said motors connected in parallel to said signal voltage source, the changes in signal voltage unbalancing said circuits to operate said motors for varying the speed of said engines, a follow-up driven by each of said motors for balancing said motor control circuits when engine speed is in agreement with the signal voltage, a signal generator for each engine, a differential motor connected to said generators having a rotor angularly displaceable by the difference in generator signals, and means actuated by the angular displacement of the differential rotor in the control circuit of the slave motor for unbalancing said circuit to alter the speed of the slave motor to correspond with that of the master engine.

5. A control and synchronizing system comprising a master engine, and a slave engine, controls for said engines to vary the rotational speeds thereof, a motor for moving each said controls, a source of signal voltage, a balanced circuit for controlling each of said motors connected in parallel to said signal voltage source, the changes in signal voltage unbalancing said circuits to operate said motors for varying the speed of said engines, a follow-up driven by each of said motors for balancing said motor control circuits when engine speed is in agreement with the signal voltage, a signal generator for each engine, a differential motor connected to said generators having a rotor angularly displaceable by the difference in generator signals, a signal generator controlled by the angular displacement of the differential rotor to develop a signal voltage in response thereto, said signal voltage being impressed on the slave motor control circuit to alter the speed of the slave engine to correspond with that of the master engine.

6. In a landing approach system for multi-engined aircraft, a throttle control for each engine of said aircraft comprising a source of signal voltage controlled by the glide path beam channel of said system, motive means for moving the throttle control of each of said engines, an inductively balanced circuit controlling each of said motive means, said circuits being connected in parallel to said signal voltage source, said circuits becoming unbalanced by changes in the signal voltages of said source to control said motive means to move the throttle controls of the engines, a signal generator driven by each engine, and inductive means responsive to the differences in generator signals to synchronize the speeds of said engines.

7. In a system of the kind described for synchronizing the speed of two engines and responsive to signals for varying engine speed, throttle means for controlling the speed of each engine, motive means for operating each of said throttle means, an inductively balanced circuit controlling said motive means, said circuit becoming unbalanced by changes in the signals and operating said motive means, a signal generator driven by each engine, inductive means responsive to the differences in generator signals, and signal means operable by said inductive means and arranged to unbalance said circuit and operate one of said motive means to synchronize the speeds of said engines.

8. In a synchronizing system, a master engine and a slave engine, a throttle control for each engine, an inductive transmitter driven by each of said engines, a differential motor connected to said transmitters, an inductive transmitter controlled by said differential motor and adapted to develop a signal voltage corresponding to the difference in speed of said engines, and motive means responsive to the signal voltage to operate said throttle control of said slave engine and synchronize the speeds of said engines.

9. In a synchronizing system, a master engine and a slave engine, a throttle control for each engine, motive means for operating each of said throttle controls, an inductively balanced circuit controlling said motive means, a signal generator driven by each engine, inductive means responsive to the differences in generator signals, and an inductive transmitter controlled by said inductive means and arranged to unbalance said circuit and operate the motive means of said slave engine to synchronize the speeds of said engines.

JOEL D. PETERSON.

References Cited in the file of this patent

UNITED STATES PATENTS

| Number | Name | Date |
|---|---|---|
| 1,971,840 | Willis | Aug. 28, 1934 |
| 2,223,708 | Van Nes | Dec. 3, 1940 |
| 2,311,642 | Crane et al. | Feb. 23, 1943 |
| 2,321,582 | Crane et al. | June 15, 1943 |
| 2,322,225 | Crane et al. | June 22, 1943 |
| 2,381,250 | Bauman | Aug. 7, 1945 |
| 2,403,243 | Seppeler | July 2, 1946 |
| 2,423,336 | Moseley | July 1, 1947 |
| 2,496,294 | Kellogg | Feb. 7, 1950 |